(12) United States Patent
Lesage et al.

(10) Patent No.: US 12,065,114 B2
(45) Date of Patent: Aug. 20, 2024

(54) RAILWAY BRAKING SYSTEM COMPRISING A DEVICE DISPLAYING A STATUS OF A SERVICE BRAKE AND/OR A STATUS OF A PARKING BRAKE AND RAIL VEHICLE PROVIDED WITH SUCH A SYSTEM

(71) Applicant: Faiveley Transport Amiens, Amiens (FR)

(72) Inventors: Stéphane Lesage, Amiens (FR); Vincent Fromont, Proyart (FR)

(73) Assignee: Faiveley Transport Amiens, Amiens (FR)

( * ) Notice: Subject to any disclaimer, the term of this patent is extended or adjusted under 35 U.S.C. 154(b) by 410 days.

(21) Appl. No.: 17/438,823

(22) PCT Filed: Mar. 12, 2020

(86) PCT No.: PCT/FR2020/050525
§ 371 (c)(1),
(2) Date: Sep. 13, 2021

(87) PCT Pub. No.: WO2020/183114
PCT Pub. Date: Sep. 17, 2020

(65) Prior Publication Data
US 2022/0097669 A1     Mar. 31, 2022

(30) Foreign Application Priority Data
Mar. 14, 2019   (FR) ...................................... 1902641

(51) Int. Cl.
    *B60T 17/22*     (2006.01)
    *B61C 17/00*     (2006.01)
    (Continued)

(52) U.S. Cl.
    CPC ............ *B60T 17/221* (2013.01); *B61C 17/00* (2013.01); *B61H 13/34* (2013.01); *F16D 66/00* (2013.01);
(Continued)

(58) Field of Classification Search
None
See application file for complete search history.

(56) References Cited

U.S. PATENT DOCUMENTS

2005/0280310 A1    11/2005   Lumbis et al.
2016/0107631 A1*    4/2016   Wallace ................ B60T 17/228
                                                                             188/1.11 E

FOREIGN PATENT DOCUMENTS

EP          2505451 A1    10/2012
WO    2004080775 A1    9/2004
(Continued)

OTHER PUBLICATIONS

International Search Report and Written Opinion mailed Jun. 9, 2020 for corresponding International Application No. PCT/FR2020/050525 (10 pages).
(Continued)

*Primary Examiner* — Melanie Torres Williams
(74) *Attorney, Agent, or Firm* — K&L Gates LLP

(57) ABSTRACT

A vehicle braking system includes a service brake and/or a parking brake, a network of pneumatic pipes provided for supplying, via at least one pneumatic pressure agent, the service brake and/or the parking brake to place the brake(s) in an engaged state or a disengaged state, and a display device for displaying the engaged state and/or the disengaged state of the service brake and/or of the parking brake. The display device includes at least one pneumatic intake connected to the service brake and/or to the parking brake via the network of pneumatic pipes, at least one electrical
(Continued)

input, at least one electro-pneumatic triggering member connected to the pneumatic intake and to the electrical input, and at least one electronic display member connected to the electro-pneumatic triggering member and controlled to display the engaged state or the disengaged state of the service brake and/or of the parking brake.

18 Claims, 6 Drawing Sheets

(51) Int. Cl.
  *B61H 13/34* (2006.01)
  *F16D 66/00* (2006.01)
  *B60T 17/04* (2006.01)
  *F16D 66/02* (2006.01)

(52) U.S. Cl.
  CPC ........... *B60T 17/04* (2013.01); *B60T 2270/88* (2013.01); *F16D 2066/005* (2013.01); *F16D 66/028* (2013.01)

(56) References Cited

FOREIGN PATENT DOCUMENTS

| | | |
|---|---|---|
| WO | 2017149244 A1 | 9/2017 |
| WO | 2017151854 A1 | 9/2017 |

OTHER PUBLICATIONS

English Translation of International Search Report mailed Jun. 9, 2020 for corresponding International Application No. PCT/FR2020/050525 (2 pages).

\* cited by examiner

RAILWAY BRAKING SYSTEM COMPRISING A DEVICE DISPLAYING A STATUS OF A SERVICE BRAKE AND/OR A STATUS OF A PARKING BRAKE AND RAIL VEHICLE PROVIDED WITH SUCH A SYSTEM

CROSS-REFERENCE TO RELATED APPLICATIONS

This application is a national phase entry of and claims priority to International Patent Application No. PCT/FR2020/050525 (filed 12 Mar. 2020), which claims priority to French Patent Application No. 1902641 (filed 14 Mar. 2019). The entire disclosures of these applications are incorporated herein by reference.

BACKGROUND

Technical Field

The subject matter described herein concerns the field of rail vehicle brakes. More particularly, the subject matter concerns a braking system for a rail vehicle, comprising a display device provided to display a state of a service brake, and/or a state of a parking brake of the braking system. The subject matter described herein also concerns the rail vehicles comprising such a braking system.

State Of The Art

Rail vehicles are generally equipped with service brake cylinders comprising a piston movable under the effect of a fluid under pressure, the movement of that piston driving a braking action such as the clamping of a disk brake between two linings, or the direct pressure of a block against a vehicle wheel.

These brake cylinders also generally comprise a parking or emergency actuator which is actuated in case of pressure loss of the fluid under pressure and/or in case of intentional venting (or draining) or leakage of the pneumatic system. This actuator, also termed parking brake, makes it possible to provide braking by virtue of the load of one or more springs substituting for the load of the fluid. Once this parking brake has been activated, the brake remains continuously engaged.

A rail vehicle braking system is known from European patent application EP 2 154 040 which is provided in particular with a parking brake actuator coupled to a rail vehicle service brake cylinder. Such a parking brake makes it possible to provide braking by virtue of the load of a spring substituting for the load of the fluid.

From European patent application EP 2 826 684 there is also known a rail vehicle braking system provided with a parking brake disposed in the service brake cylinder and comprising a blocking device configured to act on a rod of the brake piston of the service brake, and an actuating device of the blocking device. The blocking device and the actuating device are configured such that, when the braking piston is in a service braking position and the parking brake is in working configuration, the actuating device acts on the blocking device until the latter immobilizes the piston rod so as to block the braking piston in its service braking position, and when the parking brake is in resting configuration, the actuating device acts on the blocking device until the latter releases the piston rod so as to unblock the braking piston from its service braking position.

These braking systems are mounted on the rail vehicle, to be in contact with the brake disks or the wheels. In particular, they may be mechanically connected to the bogies, or to the axles fastened to the bogies, or on other devices like the drive motor or the gearbox also mounted on the bogies.

Conventionally, display devices exist that are mounted on one side of the rail vehicle, for example directly on wagons of the vehicle.

These display devices are provided to indicate a state in which is to be found the braking system, and in particular its service brake and/or its parking brake. This may for example be what is referred to as an engaged state when the rail vehicle braking system immobilizes the rail vehicle, or what is referred to as a disengaged state when the rail vehicle braking system does not immobilize that vehicle.

Such display devices may comprise mechanisms having a piston which, when they are supplied by a pneumatic pressure agent, make it possible to display an engaged or disengaged state of the braking system and, when they are not supplied by a pneumatic pressure agent, make it possible to display a second engaged or disengaged state of the braking system.

The display of these states may be made simply by the movement of a movable member of the mechanism having a piston before a viewing window of the display device.

It may however happen that these display devices indicate an intermediate state between the engaged state and the disengaged state, for example when the movable member of the mechanism having a piston does not move sufficiently between a first position in which it indicates the engaged state and a second position in which it indicates the disengaged state. This may create a doubt as to the true state of the rail vehicle braking system.

BRIEF SUMMARY

The invention concerns a braking system for a rail vehicle, comprising a display device provided to indicate a state of the rail vehicle braking system, while being simple, convenient and economical.

Thus, according to a first aspect, the invention relates to a rail vehicle braking system comprising a service brake and/or a parking brake, a network of pneumatic pipes provided for supplying, via at least one pneumatic pressure agent, the service brake and/or the parking brake to place the brake(s) in what is referred to as an engaged state or in what is referred to as a disengaged state, and a display device for displaying the engaged state and/or the disengaged state of the service brake and/or of the parking brake; characterized in that the display device comprises at least one pneumatic intake connected to the service brake and/or to the parking brake via the network of pneumatic pipes, at least one electrical input, at least one electro-pneumatic triggering member connected to the at least one pneumatic intake and to the at least one electrical input, and at least one electronic display member connected to the electro-pneumatic triggering member and controlled by the latter to display the engaged state or the disengaged state of the service brake and/or of the parking brake.

The display device of the rail vehicle braking system is particularly reliable and accurate in that it directly receives an item of information representing a pressure value in the service brake and/or in the parking brake by being pneumatically connected thereto via the network of pipes, in that it transforms that item of pneumatic information into an item of electrical information and in that it controls the electronic display member with the electrical information. Indeed, the reception of the item of pneumatic information directly from the service brake and/or from the parking brake provides reliable direct observation of the engaged and/or disengaged state, while the electronic display of the engaged or disengaged state is particularly accurate.

Such a rail vehicle braking system equips a rail vehicle with brakes having linings or blocks. The engaged state may comprise a configuration in which the service brake and/or the parking brake act on the brakes having linings or blocks of the vehicle to immobilize the latter, while the disengaged state may comprise a configuration in which the service brake and/or the parking brake leave free the brakes having linings or blocks of the vehicle so enabling the movement of the latter.

It will be noted that the rail vehicle braking system may for example comprise a braking linkage configured to act on at least one the brake of a rail vehicle having a lining or a block, a service brake comprising a braking piston movable relative to the body to act on the braking linkage and delimiting with the body the service brake pressure chamber configured to be supplied by a first source of pneumatic pressure agent to place the braking piston in a service braking position, the parking brake may be configured to act on the braking piston of the service brake and takes a working configuration and a resting configuration. The parking brake may comprise a blocking device which is movable relative to the body to act on the braking piston and can take a first position and a second position in which the blocking device is configured to immobilize the braking piston in service braking position, the parking brake then being in working configuration; The parking brake may comprise an actuating device which is movable relative to the body and having a locking position in which the actuating device is configured to hold the blocking device in its second position. The rail vehicle braking system may be configured to supply the service brake pressure chamber with another pneumatic pressure agent of which the value of the pressure is determined, so as to apply a determined braking force when the parking brake is in working configuration.

Features according to the invention that are preferred, simple, convenient and economical are presented below.

TheThe at least one electro-pneumatic triggering member may be configured to receive an item of information representing a pneumatic pressure value via the at least one pneumatic intake and transform it into at least one first item of electrical information when the pneumatic pressure value is greater than or less than a pressure threshold, for the purpose of controlling the at least one electronic display member.

TheThe at least one electro-pneumatic triggering member may be formed by an electronic pressure switch configured to detect the engaged state and the disengaged state of the service brake or of the parking brake.

TheThe at least one electro-pneumatic triggering member may be formed by two pressure switches each connected to the pneumatic intake, one of the two the pressure switches being configured to detect the engaged state of the service brake or of the parking brake and the other of the two the pressure switches being configured to detect the disengaged state of the service brake or of the parking brake.

TheThe electro-pneumatic triggering member may be configured to transmit an item of electrical information representing the engaged state or the disengaged state of the service brake and/or of the parking brake to a control and activation panel of the rail vehicle braking system.

TheThe electro-pneumatic triggering member may be configured to receive an item of pneumatic information representing a state of an electromagnetic braking device of the rail vehicle braking system and to control the electronic display member to display the state of the electromagnetic braking device, and/or to receive an item of pneumatic information representing a state of a reservoir of the at least one pneumatic pressure agent of the rail vehicle braking system and to control the electronic display member to display the state of the reservoir, and/or to receive an item of pneumatic information representing a state of a brake wear indicator device of the rail vehicle braking system and to control the electronic display member to display the state of the brake wear indicator device.

The display device may be provided with a pneumatic connector disposed on the at least one pneumatic intake to enable manual pressure measurement and/or with an electrical connector for diagnostics configured to enable the retrieval of electrical data.

The display device may comprise a body in which is housed the at least one electro-pneumatic triggering member, the at least one pneumatic intake and the at least one electrical input emerging from the body and the at least one electronic display member being at least partially mounted projecting from the body.

The display device may be electrically supplied via its electrical input by a source of electrical supply of the rail vehicle braking system, it being possible for the source of electrical supply to be at least partially autonomous.

The at least one electronic display member may be provided with a plurality of light-emitting diodes.

The display device may be configured to receive an item of pneumatic and/or electrical information representing at least one state from among a state of electrical continuity of the service brake and/or of the parking brake, a state of a main pipe and/or a state of a general pipe of the network of pneumatic pipes, and a state of isolation of the service brake and/or of the parking brake.

The at least one electronic display member may be provided with a graphical interface configured to display an item of information selected from a plurality of predetermined items of information, including at least the engaged state and/or the disengaged state of the service brake and/or of the parking brake.

It may also be a state of electrical continuity of the service brake and/or of the parking brake, and a state of a main pipe and/or a state of a general pipe of the network of pneumatic pipes, and a state of isolation of the service brake and/or of the parking brake.

The display device may be configured to receive an item of pneumatic and/or electrical information representing at least one of the parameters of vibration, of temperature and of luminosity in surroundings of the service brake and/or of the parking brake.

The display device may be configured to register the number of engaged states and/or disengaged states of the service brake and/or of the parking brake displayed by the at least one electronic display member.

According to a second aspect, the invention also relates to a rail vehicle with brakes having at least one lining or at least one block, comprising at least one rail vehicle braking system as are described above and configured to act on the at least one lining or at the at least one block of the rail vehicle, in what is referred to as an engaged state of a service brake and/or of a parking brake of the system.

BRIEF DESCRIPTION OF THE DRAWINGS

The disclosure of the invention will now be continued with the description of embodiments, given below by way of illustrative and non-limiting examples, with reference to the accompanying drawings.

DETAILED DESCRIPTION

Figure 1:
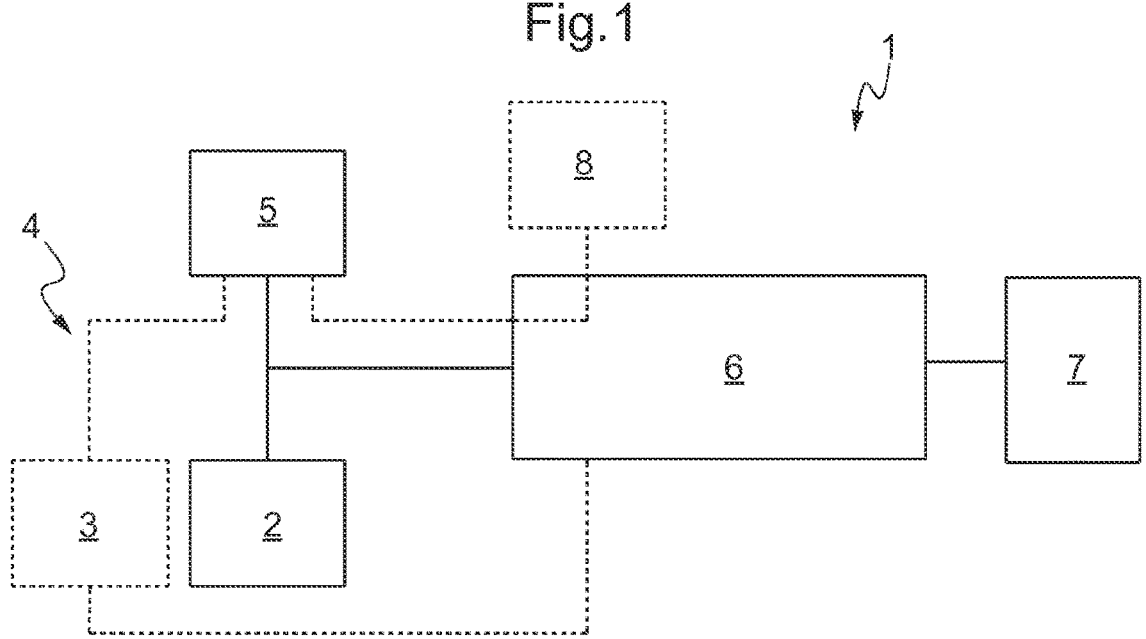
FIG. 1 diagrammatically and partially illustrates a rail vehicle braking system provided in particular with a service brake, with a parking brake, with an auxiliary reservoir, with a control and activation panel, with a control station, and with a display device for displaying at least one state of the service brake and/or of the parking brake and/or of the auxiliary reservoir.

FIG. 1 illustrates diagrammatically and partially a rail vehicle braking system 1 for a rail vehicle, provided in particular with a service brake 2, with a parking brake 3, with an auxiliary reservoir 8 containing at least one pneumatic pressure agent making it possible to pneumatically supply the service brake 2 and the parking brake 3, with a display device 5 connected to each one of the service brake 2, parking brake 3 and auxiliary reservoir 8 via a network of pneumatic pipes 4, a control and activation panel 6 connected to each one of the service brake 2, parking brake 3, display device 5 and auxiliary reservoir 8 at least via the network of pneumatic pipes 4, and with a control station 7 connected at least to the control and activation panel 6.

The service brake 2 is configured to act on brakes having linings or blocks of the rail vehicle to immobilize the latter. If required, the service brake 2 is in what is referred to as an engaged state. Otherwise, the service brake 2 is in what is referred to as a disengaged state.

The service brake 2 may be pneumatically supplied for example by the auxiliary reservoir 8 via the network of pneumatic pipes 4. The engaged state of the service brake 2 may be obtained when the latter is supplied and has a service brake pressure greater than a first threshold, while the disengaged state of the service brake 2 may be obtained when the latter is vented and/or has a service brake pressure less than the first threshold.

The parking brake 3 is also configured to act on the brakes having linings or blocks of the rail vehicle to immobilize the latter. If required, the parking brake 3 is in what is referred to as an engaged state. Otherwise, the parking brake 3 is in what is referred to as a disengaged state.

The parking brake 3 may be pneumatically supplied for example by the auxiliary reservoir 8 via the network of pneumatic pipes 4. The disengaged state of the parking brake 3 may be obtained when the latter is supplied and has a parking brake pressure greater than a second threshold, while the engaged state of the parking brake 3 may be obtained when the latter is vented and/or has a service brake pressure less than the second threshold.

The auxiliary reservoir 8 may be configured to contain the pneumatic pressure agent at a pressure at least greater than a third threshold, so as to be able to supply the service brake 2 and/or the parking brake 3.

The auxiliary reservoir 8 may thus have what is referred to as a normal state of operation when the pressure value of the pneumatic pressure agent it contains is at least greater than the third threshold, and what is referred to as a fault state of operation when the pressure value of the pneumatic pressure agent it contains is less than the third threshold.

The display device 5 is connected via the network of pneumatic pipes 4 directly to the service brake 2 and/or to the parking brake 3 and/or to the auxiliary reservoir 8.

The same principle may apply for main and general pipes of the network of pneumatic pipes which run along the rail vehicle, which may be connected or not connected to the auxiliary reservoir.

The display device 5 is configured to pneumatically detect the state of the service brake 2 and/or the state of the parking brake 3 and/or the state of the auxiliary reservoir 8, to transform the item of pneumatic information on state into an item of electrical information on state, and to electronically display the item of information relative to the state of the service brake 2 and/or of the parking brake 3 and/or of the auxiliary reservoir 8.

The display device 5 may also be configured to detect or receive an item of pneumatic information and/or electrical information representing the state of the main pipe and/or of the general pipe.

Such information may be correlated with the item of information on state of the service brake and/or of the parking brake to detect a possible fault.

The control and activation panel 6 is a central device grouping together at least pneumatic and electrical members.

The control and activation panel 6 is configured to send settings for application of the service brake 2 and/or of the parking brake 3. These may be pneumatic settings or electrical settings.

The control and activation panel 6 is furthermore configured to control the supply and/or the venting of the service brake 2 and/or of the parking brake 3 via the network of pneumatic pipes 4 and the auxiliary reservoir 8, in particular according to the settings for application of the service brake 2 and/or of the parking brake 3.

The control and activation panel 6 may be configured to control other devices of the rail vehicle braking system 1, including for example an electromagnetic braking device (not shown) and/or a brake wear indicator device.

The display device 5 may be configured to pneumatically and/or electrically detect the state of the electromagnetic braking device and/or of the brake wear indicator device.

The control and activation panel 6 may be configured to receive information, in particular electrical information, coming from the display device 5 in particular as to the state of the service brake 2 and/or the state of the parking brake 3 and/or the state of the auxiliary reservoir 8, and/or the state of the electromagnetic braking device, and/or of the brake wear indicator device.

The control station 7 may for example be located in a locomotive of the rail vehicle and be operated by a driver of that vehicle.

The control station 7 may be configured to send commands for application to the control and activation panel 6, thereby generating in particular the settings for application of the service brake 2 and/or of the parking brake 3.

The control station 7 may furthermore be configured to receive via the control and activation panel 6, the information, in particular electrical, coming from the display device 5 and for example directed to the state of the service brake 2 and/or the state of the parking brake 3 and/or the state of the auxiliary reservoir 8, and/or the state of the electromagnetic braking device.

Figure 2:
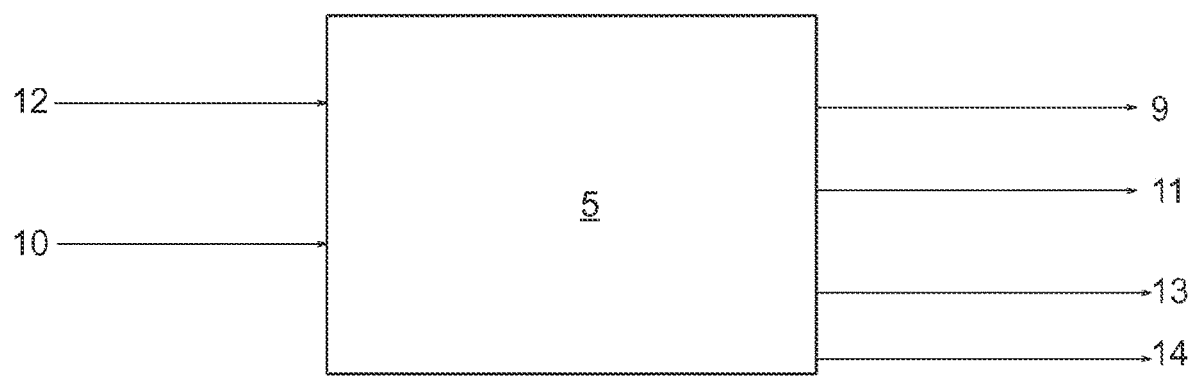
FIG. 2 diagrammatically represents the display device and the information it is able to receive, display, or send.

FIG. 2 is a diagrammatic representation of the display device 5 and the information it can receive and the information it can directly display, or even that it can send to the control and activation panel 6 and/or to the control station 7, directly or via the control and activation panel 6.

The display device 5 is configured to receive, via at least one pneumatic intake 10 provided on that display device 5, an item of pneumatic information representing the state of the service brake 2 and/or an item of pneumatic information representing the state of the parking brake 3.

The display device 5 may be configured to receive an item of pneumatic information representing the state of the auxiliary reservoir 8 via the pneumatic intake 10.

The display device 5 is configured to be electrically supplied via at least one electrical input 12 provided on that display device 5.

The display device 5 may also be configured to receive, via the pneumatic intake 10 or via the electrical input 12, an item of pneumatic or electrical information representing the state of the electromagnetic braking and/or an item of pneumatic or electrical information representing the state of the brake wear indicator device.

The display device 5 is configured to display, via a first electrical output channel 9, an item of electrical information representing the engaged state or the disengaged state of the service brake 2 and/or of the parking brake 3.

The display device may be configured to receive and/or display an item of pneumatic and/or electrical information representing a state of electrical continuity of the service brake and/or of the parking brake, and/or of a state of isolation of the service brake and/or of the parking brake.

By electrical continuity is meant the verification for example that the engaged state of the service brake and/or of the parking brake does indeed apply throughout the length of the rail vehicle. This may for example be achieved by the presence of an electrical cable running the length of the train and passing via each triggering member and associated display device.

By isolation is meant inhibition of one or more service brakes and/or parking brakes, for example located on a bogie.

The display device may be configured to receive an item of pneumatic and/or electrical information representing at least one of the parameters of vibrations, of temperature and of luminosity in surroundings of the service brake and/or of the parking brake. This may for example make it possible to give information relative to the maintenance either of the service brake and/or the parking brake for example if the level of vibrations has exceeded a predetermined threshold or if the temperature has exceeded a predetermined threshold, or of an item in surroundings for example such as the rails if the level of vibrations has exceeded a predetermined threshold.

The parameter relative to the luminosity in surroundings may enable the lighting level of the display device to be adjusted.

These parameters of vibrations, temperature and luminosity may be obtained for example by accelerometers, thermocouples and sensors that are integrated in the electro-pneumatic triggering member or that are situated away.

The display device 5 may be configured to display, via the electrical output channel 9, an item of electrical information representing the state of the auxiliary reservoir 8 and/or of the electromagnetic braking device and/or of the brake wear indicator device.

The display device 5 may be configured to send, via a second electrical output channel 11, an item of electrical information representing at least the engaged state or the disengaged state of the service brake 2 and/or of the parking brake 3 at the control and activation panel 6 and/or at the control station 7, directly or via the control and activation panel 6.

The display device 5 is provided with a pneumatic connector 13 which may be connected directly to the pneumatic intake 10 and which enables manual measurement by an operator of the pneumatic pressure present at the pneumatic intake 10.

The display device 5 may also be configured to display, via an electronic output channel 14, information items representing for example pressure values in the service brake 2 and/or in the parking brake 3 and/or in the auxiliary reservoir 8, numbers of service braking and or parking braking cycles, etc.

The display device may be configured to count and display the number of service braking and/or parking braking cycles, in other words the number of engaged states and/or disengaged states of the service brake and/or of the parking brake displayed by the electronic display member. This may for example make it possible to give information relative to the maintenance of the service brake and/or of the parking brake, and for example in particular relating to the replacement of the linings. This information may be correlated with the parameters of vibration, temperature and luminosity.

The display device may be provided with an electrical connector for diagnostics configured to enable the retrieval of electrical data.

The electronic display member may be provided with a graphical interface configured to display an item of information selected from among a plurality of predetermined items of information, including a state of electrical continuity of the service brake and/or of the parking brake, a state of a main pipe and/or a state of the general pipe of the network of pneumatic pipes, and a state of isolation of the parking brake and/or of the parking brake, information relating to the parameter of vibrations, temperature and/or luminosity; and possibly also warnings or information resulting from the aforementioned information.

All this information may be sent from the electronic display member to the control and activation panel and/or to the control station.

Figure 3:
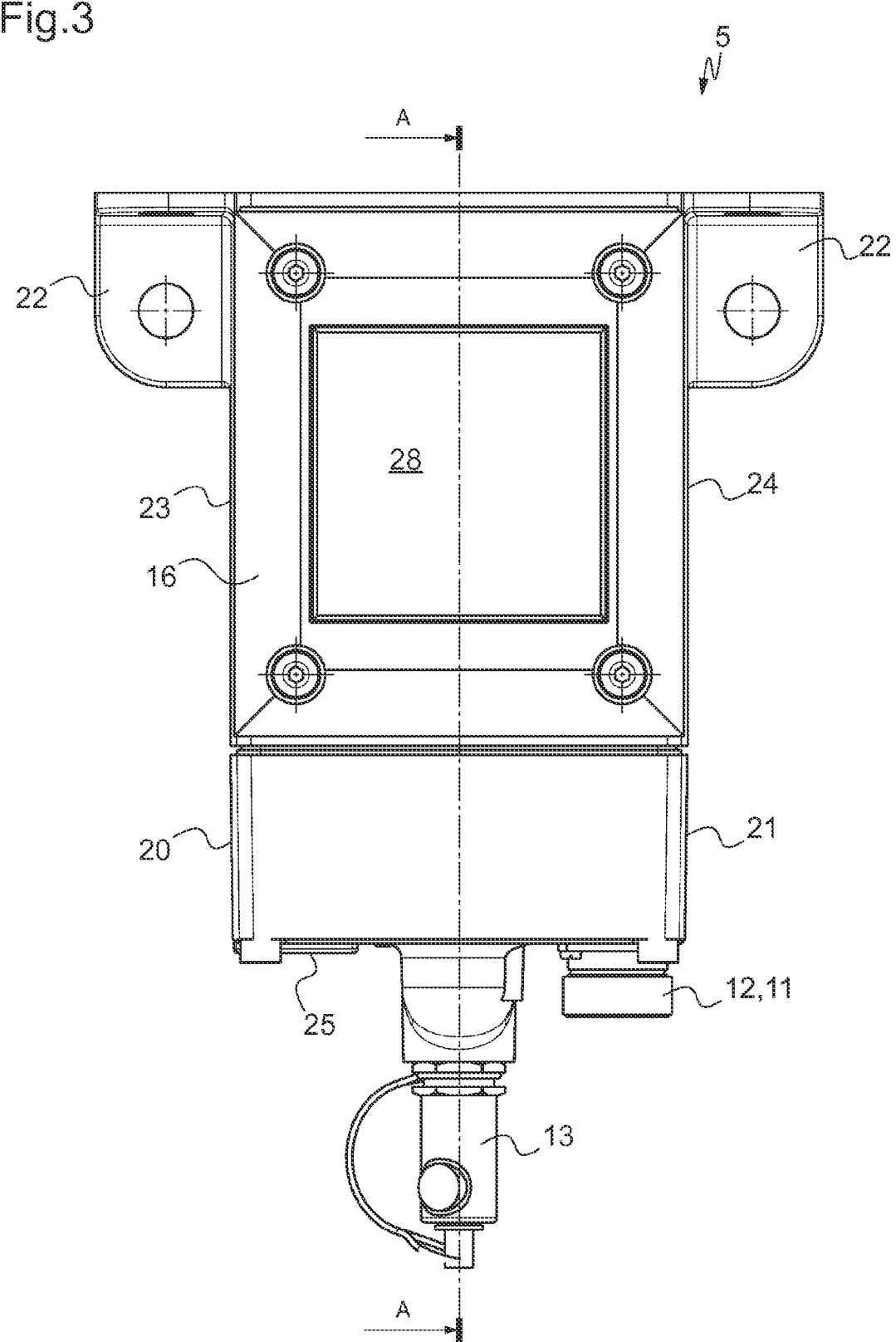
FIG. 3 is a front view of a display device according to one embodiment.
Figure 4:
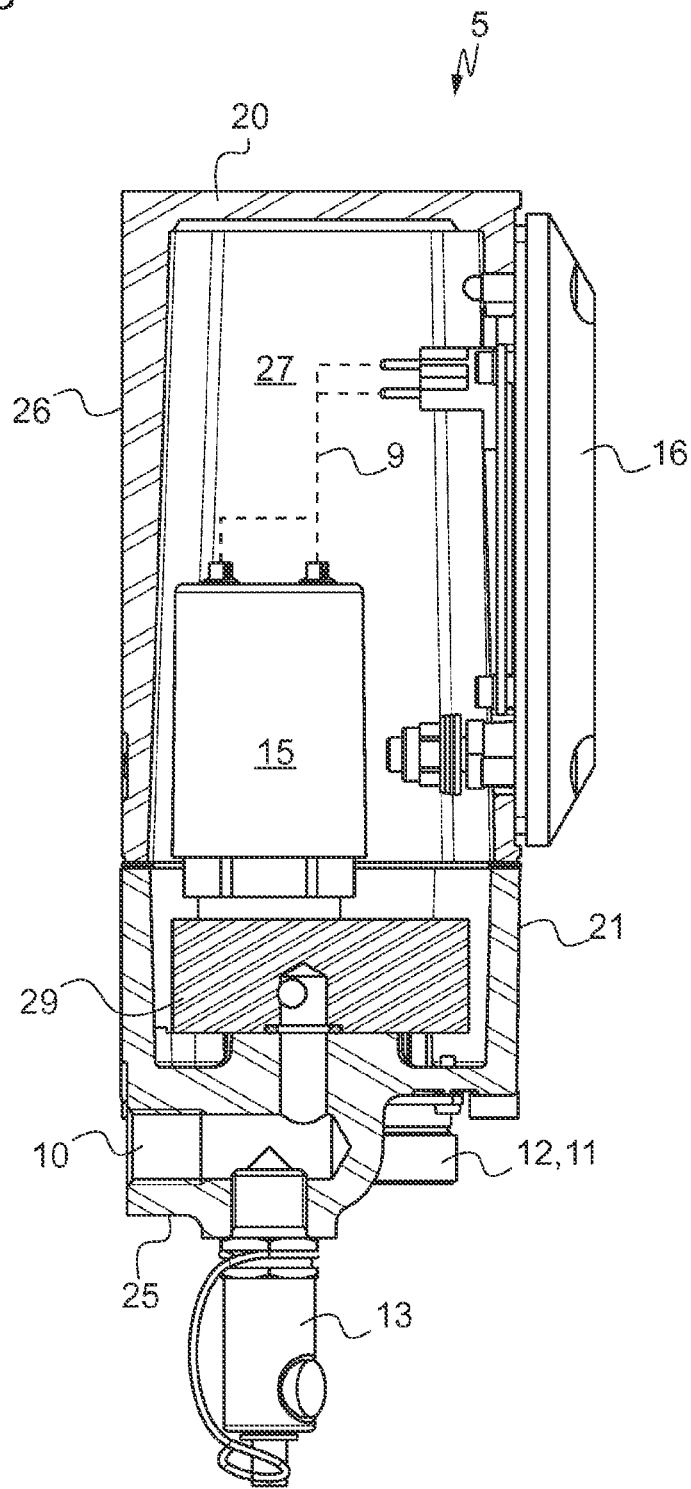
FIG. 4 is a cross section view on A-A in FIG. 3.
Figure 5:
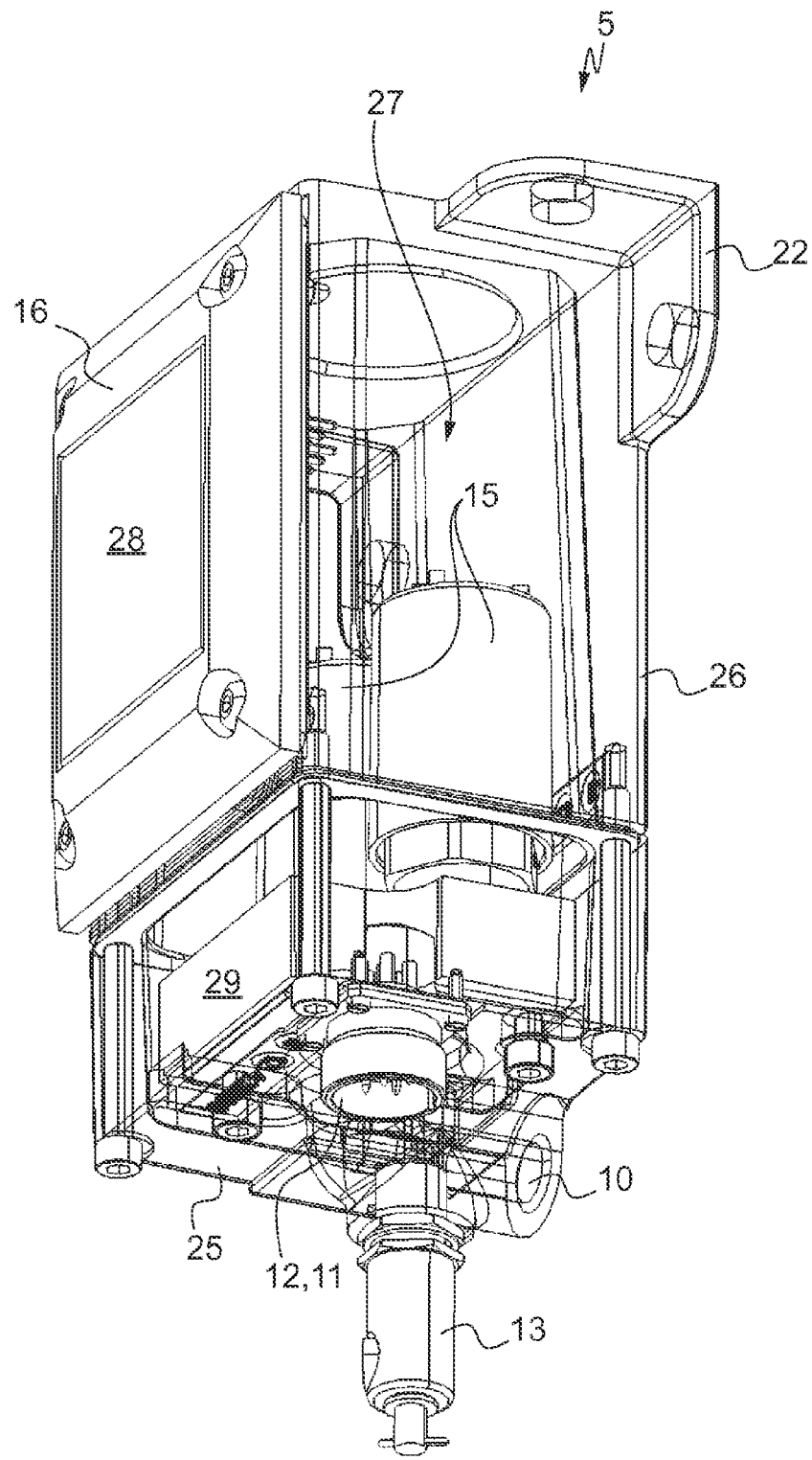
FIG. 5 is a perspective view shown partially with transparency of the display device illustrated in FIGS. 3 and 4.

A description will now be given in more detail, with reference to FIGS. 3 to 5, of an embodiment of the display device 5.

Such a display device 5 is for example provided to be mechanically connected on one side of a wagon of the rail vehicle, for example so as to facilitate the acquisition by an operator of the information displayed by that display device 5. This is particularly convenient in particular when the vehicle is at a platform, for example for the purpose of operations of maintenance or before a cycle of locomotion.

The display device 5 may comprise a body 20 of parallelepiped general shape, having a front face 21 from which projects at least partly an electronic display member 16 of that display device 5.

The electronic display member 16 is provided here with a light-emitting diode display screen 28.

The electronic display member 16 may furthermore be provided with a graphical interface configured to display an item of information selected from a plurality of predetermined items of information, including at least the engaged state and/or the disengaged state for example of the service brake 2.

The display device 5 may be provided with fastening lugs 22 extending from opposite sides 23 and 24 of the body 20 and which are provided for its mechanical connection for example to the wagon.

The body 20 of the display device 5 is provided here with a lower face 25 from which projects the pneumatic connector 13 for the manual measurement of pressure by an operator.

The pneumatic intake 10 also projects here from this lower face 25 and extends to a back face 26 where it emerges, which back face 26 is an opposite face to the front face At the location of the lower face 25 of the body 20 there furthermore emerges the electrical input 12, formed here for example by a connector with multiple pins.

The display device 5 comprises electro-pneumatic triggering members 15 which are accommodated in an internal space 27 delimited by the body 20.

In the example described, the electro-pneumatic triggering members 15 are two in number and are formed by pressure switches. One of the two pressure switches 15 is the to be a lower threshold pressure switch and the other of the pressure switches 15 is the to be an upper threshold pressure switch (see below).

The two pressure switches 15 are configured here to detect the state of the service brake 2.

The two pressure switches 15 are connected here to the pneumatic intake 10 via a distributor 29 in pneumatic communication with the pneumatic intake 10 and with the two pressure switches 15, as well as at the electrical input 12.

In the described example, the pressure switches 15 are electrically supplied by an electrical source of the braking system which is able in particular to transit via the control and activation panel 6.

As a variant, this could be an autonomous electrical source for example directly mounted on the body 20 of the display device 5 or mounted in the vicinity of the latter. The two pressure switches 15 are furthermore connected here to the electronic display member 16 and are configured to control that electronic display member 16 to display the engaged state or the disengaged state of the service brake 2.

The pressure switch 15 referred to as upper threshold pressure switch is configured here to detect that the value of pneumatic pressure in the service brake 2 is greater than the first threshold, thus indicating that the service brake 2 is in the engaged state.

As regards the pressure switch 15 referred to as lower threshold pressure switch, this is configured to detect that the value of pneumatic pressure in the service brake 2 is less than the first threshold, thus indicating that the service brake 2 is in the disengaged state.

The pressure switches 15 are configured to transform the information received into a first item of electrical information representing the engaged or disengaged state of the service brake 3, and to send that first item of electrical information, via the first electrical output channel 9, to the electronic display member 16 for the purpose of controlling the information displayed by the latter.

As a variant, the pressure switches 15 are configured to detect the state of the parking brake 3. In particular, the pressure switch referred to as upper threshold pressure switch is configured to detect that the value of pneumatic pressure in the parking brake is greater than the second threshold, thus indicating that the parking brake is in the disengaged state; while the pressure switch referred to as lower threshold pressure switch is configured to detect that the value of pneumatic pressure in the parking brake is less than the second threshold, thus indicating that the parking brake is in the engaged state.

The pressure switches 15 are furthermore configured to send this first item of electrical information, via the second electrical output channel 11, to the control and activation panel 6 and/or to the control station 7, directly or via the control and activation panel 6.

It will be noted that the second electrical output channel 11 is formed here in common with the connector with multiple pins of the electrical input 12.

As a variant, this could be a distinct connector.

Figure 6:
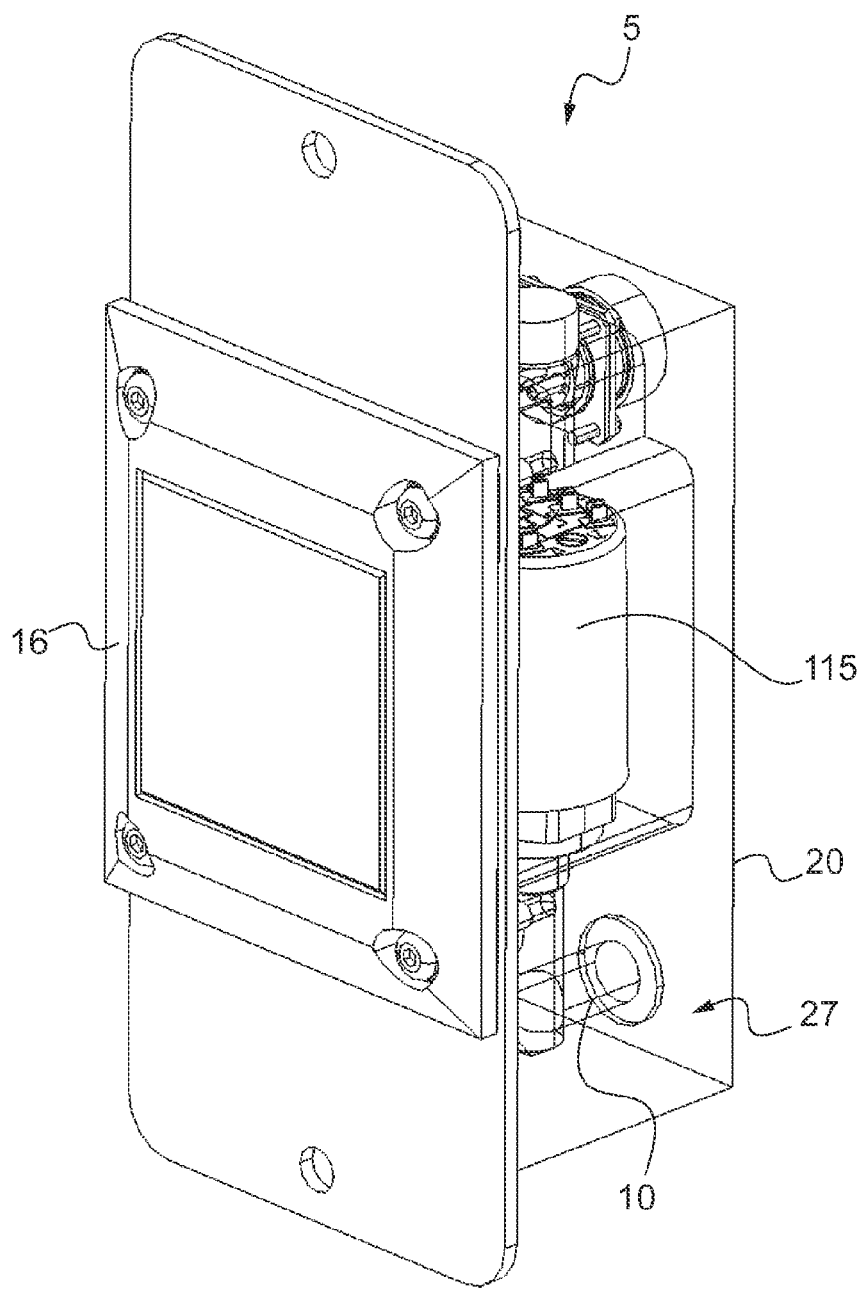
FIG. 6 is a perspective view shown partially with transparency of a variant embodiment of the display device.
Figure 7:
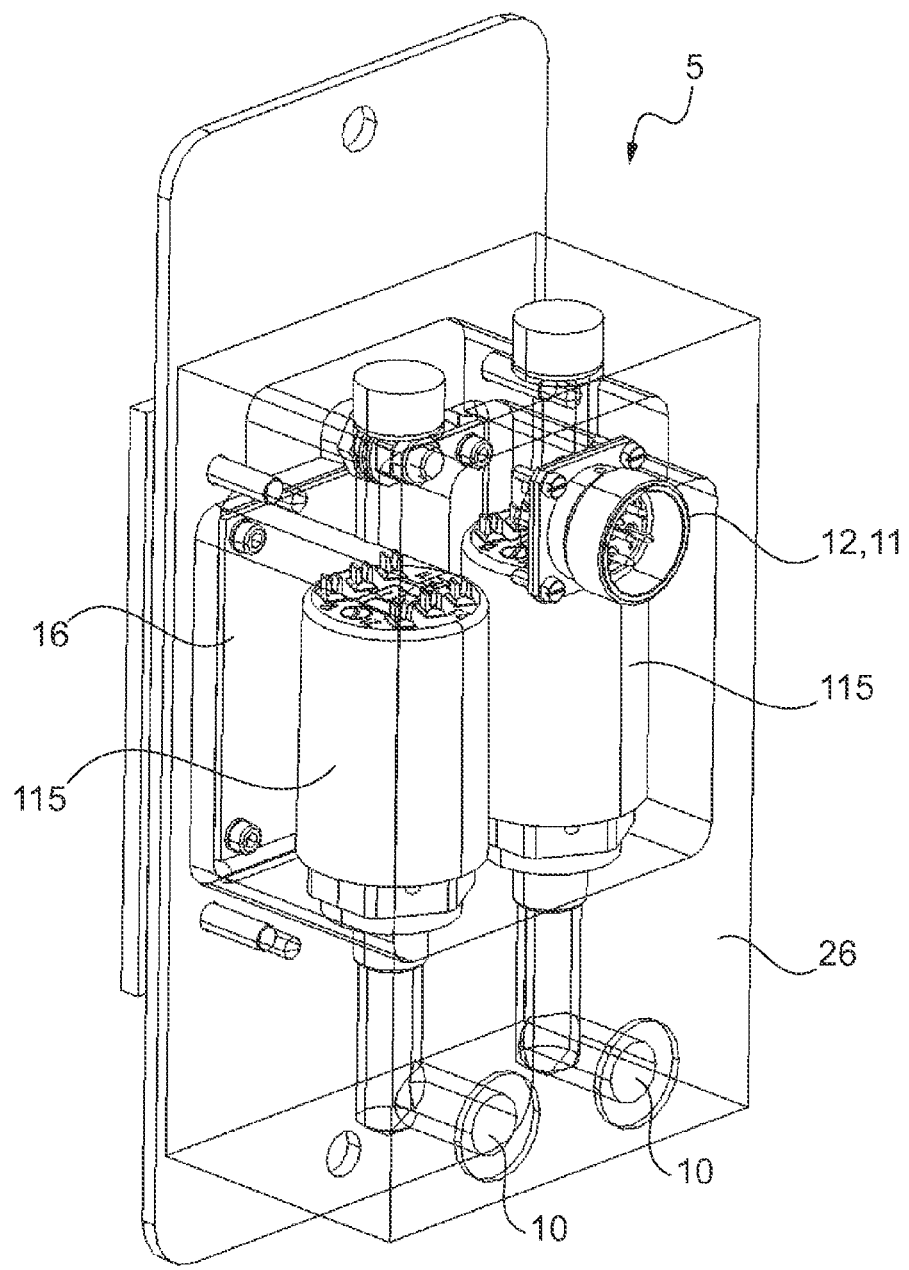
FIG. 7 is a similar view to that of FIG. 6, taken from another viewing angle.

With reference to FIGS. 6 and 7, a description will now be given of a variant embodiment of the display device illustrated in FIGS. 3 to 5.

The display device 5 illustrated in FIGS. 6 and 7 differs in that it is configured to detect and display the state of the parking brake 3 and the state of the auxiliary reservoir 8, rather than the state of the service brake.

In particular, the display device 5 is provided with two electro-pneumatic triggering members each formed by an electronic pressure switch 115.

These electronic pressure switches 115 are housed in the internal space 27 of the body 20 of the display device 5 and are each connected directly to a dedicated pneumatic intake 10.

The pneumatic inputs 10 may for example emerge on the back face 26 of the body 20. The electrical input 12 may also emerge on the back face 26 of the body 20.

The two electronic pressure switches 115 are furthermore connected here to the electronic display member 16 and are configured to control that electronic display member 16 to display, via the first electrical output channel 9, the engaged state or the disengaged state of the parking brake 2 and the normal state of operation or the fault state of operation of the auxiliary reservoir 8.

In other words, one of the electronic pressure switches 115 is configured to detect whether the value of pneumatic pressure in the parking brake is less than or greater than the second threshold, thereby indicating respectively that the parking brake is in the engaged state or in the disengaged state.

The other of the electronic pressure switches 115 is configured to detect whether the pressure value of the pneumatic pressure agent that the auxiliary reservoir 8 contains is greater than or less than the third threshold, thereby indicating respectively that the auxiliary reservoir 8 is in a normal state of operation or in a fault state of operation.

The pressure switches 115 may also be configured to send the electrical information relating to the state of the parking brake and to the state of the auxiliary reservoir, via the second electrical output channel 11, to the control and activation panel 6 and/or to the control station 7, directly or via the control and activation panel 6.

It will be noted that the second electrical output channel 11 is formed here in common with the multiple pin connector of the electrical input 12.

Variants not illustrated are presented below.

The display device may comprise more or fewer electro-pneumatic triggering members, of the pressure switch or electrical pressure switch type, such that it can detect and display, or even transmit, at least one item of information selected from a plurality of predetermined items of information, including at least the engaged or disengaged state of the service brake, the engaged disengaged state of the parking brake and the state of the auxiliary reservoir, and possibly also the state of the electromagnetic braking device, the state of the brake wear indicator device, the values of pressures in the service brake and/or in the parking brake and/or in the auxiliary reservoir, the number of braking cycles of service and/or parking braking, etc.

The pressure switches may be replaced for example by pressure sensors associated with an electrical unit of the electronic display member or with a distinct electronic box housed in the body.

The display device may have a body having a form different from a parallelepiped general shape.

The display device may be at least partly built in to the wagon.

More generally, the invention is not limited to the examples described and illustrated.

What is claimed is:

1. A rail vehicle braking system comprising:
   one or more of a service brake or a parking brake;
   a network of pneumatic pipes provided for supplying, via at least one pneumatic pressure agent, the one or more of the service brake or the parking brake to place the one or more of the service brake or the parking brake in an engaged state or a disengaged state; and
   a display device for displaying the engaged state or the disengaged state of the one or more of the service brake or the parking brake, wherein the display device comprises at least one pneumatic intake connected to the one or more of the service brake or the parking brake via the network of pneumatic pipes, at least one electrical input, at least one electro-pneumatic triggering member connected to the at least one pneumatic intake and to the at least one electrical input, and at least one electronic display member connected to the electro-pneumatic triggering member and controlled by the electro-pneumatic triggering member to display the engaged state or the disengaged state of the one or more of the service brake or the parking brake, the display device electrically supplied via the at least one electrical input by a source of electrical supply of the rail vehicle braking system that is at least partially autonomous.

2. The rail vehicle braking system of claim 1, wherein the at least one electro-pneumatic triggering member is configured to receive an item of information representing a pneumatic pressure value via the at least one pneumatic intake and transform the item of information into at least one first item of electrical information when the pneumatic pressure value is greater than or less than a pressure threshold, for controlling the at least one electronic display member.

3. The rail vehicle braking system of claim 2, wherein the at least one electro-pneumatic triggering member is formed by an electronic pressure switch configured to detect the engaged state or the disengaged state of the one or more of the service brake or the parking brake.

4. The rail vehicle braking system according to claim 2, wherein the at least one electro-pneumatic triggering member is formed by two pressure switches each connected to the pneumatic intake, one of the two pressure switches being configured to detect the engaged state of the one or more of the service brake or the parking brake and the other of the two pressure switches being configured to detect the disengaged state of the one or more of the service brake or the parking brake.

5. The rail vehicle braking system of claim 1, wherein the electro-pneumatic triggering member is configured to transmit an item of electrical information representing the engaged state or the disengaged state of the one or more of the service brake or the parking brake to a control and activation panel of the rail vehicle braking system.

6. The rail vehicle braking system of claim 1, wherein the electro-pneumatic triggering member is configured to:
   receive an item of pneumatic information representing a state of an electromagnetic braking device of the rail vehicle braking system and to control the electronic display member to display a state of the electromagnetic braking device,
   to receive an item of pneumatic information representing a state of a reservoir of the at least one pneumatic pressure agent of the rail vehicle braking system and to control the electronic display member to display a state of the reservoir, or
   to receive an item of pneumatic information representing a state of a brake wear indicator device of the rail vehicle braking system and to control the electronic display member to display a state of the wear indicator device of the rail vehicle braking system.

7. The rail vehicle braking system of claim 1, wherein the display device is provided with a pneumatic connector disposed on the at least one pneumatic intake to enable manual pressure measurement or with an electrical connector for diagnostics configured to enable retrieval of electrical data.

8. The rail vehicle braking system of claim 1, wherein the display device includes a body in which the at least one electro-pneumatic triggering member is housed, the at least one pneumatic intake and the at least one electrical input emerging from the body and the at least one electronic display member being at least partially mounted and projecting from the body.

9. The rail vehicle braking system of claim 1, wherein the at least one electronic display member is provided with a plurality of light-emitting diodes.

10. The rail vehicle braking system of claim 1, wherein the display device is configured to receive an item of one or more of pneumatic information or electrical information representing at least one state from among a state of electrical continuity of the service brake or of the parking brake, a state of a main pipe or a state of a general pipe of the network of pneumatic pipes, and a state of isolation of the service brake or of the parking brake.

11. The rail vehicle braking system of claim 1, wherein the at least one electronic display member is provided with a graphical interface configured to display an item of information selected from a plurality of predetermined items of information, including at least the engaged state or the disengaged state of the one or more of the service brake or the parking brake.

12. The vehicle braking system of claim 1, wherein the display device is configured to receive an item of pneumatic or electrical information representing at least one of parameters of vibration, of temperature, or of luminosity in surroundings of the service brake or the parking brake.

13. The rail vehicle braking system of claim 1, wherein the display device is configured to register a number of engaged states or disengaged states of the service brake or the parking brake displayed by the at least one electronic display member.

14. A rail vehicle having brakes with at least one lining or with at least one block, comprising at least one rail vehicle braking system according to claim 1, which is configured to act on the at least one lining or at least one block of the rail vehicle in the engaged state of the one or more of the service brake or the parking brake of the rail vehicle braking system.

15. A vehicle braking system comprising:
a brake;
a network of pneumatic pipes provided for supplying, via at least one pneumatic pressure agent, the brake to place the brake in an engaged state or a disengaged state; and
a display device for displaying the engaged state or the disengaged state of the brake, the display device including a pneumatic intake connected to the brake via the network of pneumatic pipes, an electrical input, an electro-pneumatic triggering member connected to the pneumatic intake and to the electrical input, and at least one electronic display member connected to the electro-pneumatic triggering member and controlled by the electro-pneumatic triggering member to display the engaged state or the disengaged state of the brake, the electro-pneumatic triggering member configured to receive information representing a pneumatic pressure value via the at least one pneumatic intake and transform the information into electrical information for controlling the electronic display member.

16. The vehicle braking system of claim 15, wherein the electro-pneumatic triggering member is formed by an electronic pressure switch configured to detect the engaged state or the disengaged state of the brake.

17. The vehicle braking system according to claim 15, wherein the electro-pneumatic triggering member is formed by pressure switches each connected to the pneumatic intake, a first switch of the pressure switches configured to detect the engaged state of the brake and a second switch of the pressure switches configured to detect the disengaged state of the brake.

18. The vehicle braking system of claim 15, wherein the electro-pneumatic triggering member is configured to communicate electrical information representing the engaged state or the disengaged state of the brake to a control and activation panel.

* * * * *